(12) United States Patent
Smith et al.

(10) Patent No.: US 7,343,328 B1
(45) Date of Patent: Mar. 11, 2008

(54) NETWORKED PRODUCT SELECTION SYSTEM AND METHOD FOR ITS USE

(75) Inventors: Kirsten Smith, Towson, MD (US); Ryan O'Toole, Evanston, IL (US); Pamela (Major) Galeone, Woodstock, MD (US)

(73) Assignee: Black & Decker Inc., Newark, DE (US)

( * ) Notice: Subject to any disclaimer, the term of this patent is extended or adjusted under 35 U.S.C. 154(b) by 194 days.

(21) Appl. No.: 10/016,727

(22) Filed: Dec. 10, 2001

Related U.S. Application Data

(60) Provisional application No. 60/254,128, filed on Dec. 8, 2000.

(51) Int. Cl.
*G06Q 19/00* (2006.01)
(52) U.S. Cl. .................................................. 705/27
(58) Field of Classification Search .............. 706/52; 705/26, 27
See application file for complete search history.

(56) References Cited

U.S. PATENT DOCUMENTS 6,012,051 A * 1/2000 Sammon et al. ............... 706/52
6,035,283 A * 3/2000 Rofrano ....................... 705/27
6,633,852 B1 * 10/2003 Heckerman et al. ......... 705/27

OTHER PUBLICATIONS www.surprise.com posted on Oct. 6, 2000 found with"the WayBack Machine" on www.archive.com.*
Microsoft Computer Dictionary, 1999, Microsoft Press, Fourth Edition, pp. 40 and 147.*
"Service equals sales", Mar. 1993, Incentive vol. 167, Iss. 3 p. 23-30.*
www.doityourself.com published on the Internet Nov. 10, 2000 (found using archive.com's WayBack Machine).*

* cited by examiner

*Primary Examiner*—R. Weisberger
(74) *Attorney, Agent, or Firm*—Harness, Dickey & Pierce, P.L.C.

(57) ABSTRACT

A networked system with a product finder associated with an expert system is used to assist a shopper in making a product selection. A shopper interacts with the server through a browser over the network. The system can be connected to a retail server in such a way as to allow a shopper to complete a purchase. The expert system presents a series of questions to the shopper. By answering the questions, the shopper drills down through a hierarchy to arrive at a recommended product. Alternately, the shopper fills out a screen of data which is then used as a filter to identify an appropriate product.

26 Claims, 5 Drawing Sheets

Login [ ]      Password [ ]  Go      Password Reminder      Search [All ▼] [ ]

BLACK&DECKER

▸ PRODUCT GUIDE
  Power Tools
  Outdoor Equipment
  Cleaning Products
  Accessories
  New Products
  Product Finder™
▸ Gift Finder™
  Accessory Finder™
  Innovation center
  Buyers' Guides
  Press Releases
TOOL SCHOOL
PROJECT CENTER
PEOPLE & EVENTS
CUSTOMER SERVICE
STORE LOCATOR
GIFT REGISTRY

GIFT *FINDER* ™

Are you looking for a particular type of gift?
⎰ -Choose a Gift Type- ▼ ⎱ ~122
⎱ Tell us about the recipient's interests. ⎰
120 ⎰ -Choose an Interest- ▼ ⎱ ~124

What is the approximate skill level of the recipient?

⎰ ○ Non do-it-yourselfer: does not do any of these projects in or around the house
⎱
126 ⎰ ○ Light do-it-yourselfer: does light maintenance, repair and assembly projects
⎱
⎰ ○ Medium do-it-yourselfer: completes home maintenance and repair projects
⎱
⎱ ○ Serious do-it-yourselfer: completes major projects such as building, renovating, and
⎰    fine woodworking around the home

130

How much would you like to spend?

⎰ ○ under $10
⎱ ○ $11 - $23
128 ⎰ ○ $24 - $55
⎱ ○ $56 - $75
⎰ ○ $76 - $105
⎱ ○ Over $106

[ Pick a Gift ] ~140

[Quick Finder ▼]      Terms and Conditions  |  Privacy Policy

*Fig-5*

NETWORKED PRODUCT SELECTION SYSTEM AND METHOD FOR ITS USE

CROSS-REFERENCE TO RELATED APPLICATION

This application claims the benefit of U.S. Provisional Application No. 60/254,128 filed on Dec. 8, 2000

FIELD OF THE INVENTION

The invention relates to a networked product selection system and a method for its use. More specifically, it relates to electronic commerce and an expert system for directing a shopper to a successful purchasing decision.

BACKGROUND OF THE INVENTION

In the internet age, businesses are becoming more aware of the advantages to be gained by using information technology to streamline their business processes. Electronic data exchange and other electronic commerce transactions among businesses are becoming commonplace, as businesses seek to drive out costs and increase productivity.

On the consumer side, use of the internet is growing for all kinds of interactions with businesses. Internet shopping is growing especially popular, with its attendant ease of use and convenience. Especially at the holiday season, but also throughout the year, internet shoppers are looking for products to be used by others as well as for items for personal consumption.

Manufacturers supply their products to retail outlets, which in turn offer the products for sale to the public. Some of the more successful retail outlets are those that provide a high level of customer service, including expert in-store guidance on how to choose exactly the product a shopper is interested in. Retailers provide such services to build loyalty in their customers to gain repeat business.

Many retailers are now establishing commercial sites on the world wide web. The web sites offer an easy and convenient shopping experience that more and more consumers are taking advantage of. The retailers use the sites in part to reach markets not previously served by their retail locations. However, a disadvantage of the commercial sites is the lack of expert personal advice on selection of products. It would therefore be desirable to provide tailored expert advice associated with the internet shopping experience.

Retailers typically carry the brands of many different manufacturers. In many cases, a retailer represents hundreds or thousands of suppliers. Such retailers can not be expected to provide expert advice in selecting all of the many products they sell. Manufacturers, on the other hand, make a line of products and naturally have a great deal of specialized knowledge about the use of the products. In addition, they have a high incentive to educate consumers as to the features and advantages of their products. To this end, they typically carry out marketing campaigns to increase retail sales that are separate from and independent of the advertising of the retailer.

One attraction of commerce over the internet is the ability to reach customers directly without having to go through a middle man. However, as noted above, the internet experience is impersonal as compared to a retail shopping experience. The present invention provides a network based system and method for manufacturers and others to provide product selection advise to consumers via an electronic medium.

The invention takes advantage of business to business information technology to accomplish its objects while offering the shopper the convenience of online shopping and the personalized attention and advice expected from a retail outlet.

SUMMARY OF THE INVENTION

The invention provides a networked system with a product finder associated with an expert system that is used to assist a shopper in making a product selection. A shopper interacts with the server through a browser over the network. The system can be connected to a retail server in such a way as to allow a shopper to complete a purchase. The expert system presents a series of questions to the shopper. By answering the questions, the shopper drills down through a hierarchy to arrive at a recommended product. Alternately, the shopper fills out a screen of data which is then used as a filter to identify an appropriate product.

BRIEF DESCRIPTION OF THE DRAWINGS

FIG. 5 is a page print out of a web implementation of one embodiment of the finder of the invention.

DESCRIPTION OF THE PREFERRED EMBODIMENTS

Figure 1:
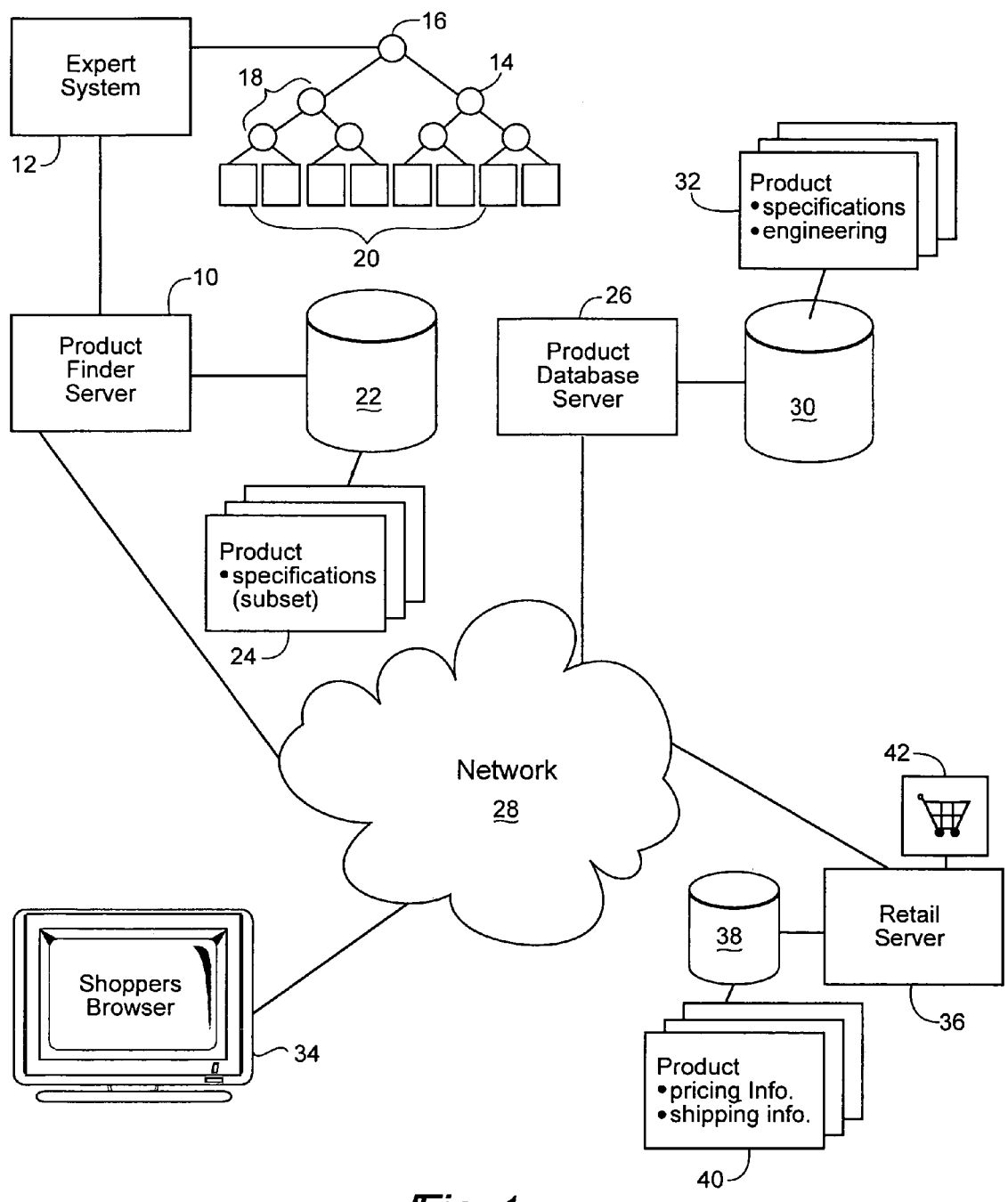
FIG. 1 is a system blocked diagram illustrating a presently preferred embodiment of the finder of the invention.

The product finder of the present invention is adapted for use over a networked system such as the Internet. The system may be implemented using Internet web technology, interactive television technology, in-store kiosk technology and the like. FIG. 1 illustrates a networked implementation of the type that might be deployed over the Internet. The basic structure can readily be adapted to accommodate other types of environments, including the interactive television and in-store kiosk environments discussed above.

Referring to FIG. 1, the product finder may be implemented on a product finder server 10 that has an associated expert system 12 that is used to assist a shopper in making a product selection. The expert system 12 may employ any of a number of artificial intelligence mechanisms to help the shopper locate a product or products of interest. The embodiment illustrated here uses a decision tree 14 to assist the shopper in product selection. As illustrated here, decision tree 14 is a binary tree structure having a root node 16, a plurality of intermediate nodes 18, and a plurality of leaf nodes 20. Each of the root nodes and intermediate nodes contain questions that may be answered by selecting one of two choices. Each of these nodes branches to two child nodes, depending on which of the two choices was selected. The leaf nodes contain recommendations that the expert system makes to the shopper, based on a shopper's answers to the root node and intermediate node questions. A further example of how such an expert system may be implemented will be provided below in connection with FIGS. 2-4. It should be recognized. however, that the illustrated expert system based on a binary decision tree is simply one possible implementation of the invention. The decision tree structure need not be limited to a binary, YES/NO structure, nor does the expert system need to be limited to decision tree technology. Other expert systems such as neural networks and statistically modeled systems may be used. Thus, while the illustrated embodiment is based on an expert system that is constructed in advance, by persons knowledgeable about the available products and their capabilities, another embodiment might employ an expert system that "learns" by observing product selection behavior of others as the system is being used.

Such learning systems may be implemented by constructing a shopper behavior model and then training the model based on data obtained as shoppers are using the system. Such a learning system would, for example, would be able to assist a shopper in selecting a product that was popular with other shoppers under similar circumstances.

In the framework of a networked product finder server that has an associated expert system to assist a shopper in making a product selection, the invention may be deployed in a number of embodiments. In general, the embodiments correspond to differing levels of sophistication on the part of the purchaser, and different configurations of the relationship of the purchaser to the intended recipient of the product.

In one embodiment, which can be called a gift finder, the shopper or purchaser is buying a product intended to be used by another. In this embodiment, the expert system will preferably present the shopper with questions based on the characteristics of the intended recipient.

In another embodiment, the shopper is purchasing a product for his own use. In this embodiment, the expert system will present questions to the shopper directly, inquiring as to what features are desired, or what benefits are important to the shopper.

In a third embodiment, the shopper is relatively more sophisticated, and has a good idea exactly of what product he wants to purchase. In such an embodiment, the expert system presents a simple series of questions designed to direct the shopper to the product he wants.

These and other embodiments can be implemented using the database structure, product classes, and relevant attributes discussed below.

The product finder server 10 has knowledge of the available products and the appropriate product specifications needed to make a product selection. In the illustrated embodiment, the product finder server 10 includes a local database 22 for storing information about products and the relevant specifications, as illustrated diagrammatically at 24. The information stored in local database 22 can be provided in a number of ways. In the illustrated embodiment, a separate product database server 26 provides this information to the product finder server 10 by communicating over network 28. The product database server has an associated master database 30, which contains all information about available products, their specifications and other engineering data, as illustrated diagrammatically at 32. The product database server 26 can be configured to periodically upload relevant information to the product finder server 10, to ensure that that the product finder server operates using reasonably current information about the products. Either push or pull technology can be used. Thus the product finder server can "pull" information from the product database server 26, as needed, or it may be configured to permit the product database server to "push" updated information to it on a periodic basis.

The use of dual databases as illustrated in the embodiment of FIG. 1 has several advantages. First, the product database server 26 can supply information to multiple other servers, each potentially providing different kinds of services. For example, the product database server could also serve information to a business-to-business server designed to facilitate the ordering of products to restock retail shelves and warehouses. The product database server may also provide information to engineering teams who are working on developing new products. These are but two examples; the uses of the information maintained by the product database server are endless.

In most practical implementations, the product database server 26 supplies only a subset of its database to the product finder server. The product finder service would not, for example, require detailed engineering information that an engineering development team might require. Thus, this detailed engineering information would not be supplied to the product finder server.

The dual database architecture illustrated in FIG. 1 offers another advantage, namely speed. In general, retrieving information from a database takes a finite amount of time which increases with the size of the database. Thus, by uploading into local database 22 a subset of the entire master database 30, the product finder server 10 can operate more quickly. The shopper thus perceives a faster response time, which makes use of the product finder more enjoyable.

While the dual database architecture is presently preferred, alternate embodiments are envisioned where the product finder server either maintains the entire master database locally or dispenses altogether with the local database, using the master database 30 for processing all product finder services. It is envisioned that future database technology may allow such alternate architecture to perform product finder services while giving the shopper an enjoyable, fast-paced experience. Distributed architectures are also possible. In such architectures, the information needed to provide product finder services (e.g., stored in local database 22 in the embodiment of FIG. 1) can be distributed across multiple databases connected to network 28.

The product finder server is preferably connected to network 28 to allow shoppers to access its functionality from any convenient node on network 28. For example, the shopper may use a personal computer, kiosk terminal, interactive television terminal, or the like to interact with the product finder server through a suitable browser 34. In a presently preferred embodiment, the browser 34 is designed to interpret and display information conveyed as web pages from the product finder server 10. Browser 34 also accepts user interaction through its user interface, to allow the user to send information to the product finder server 10 (through cursor-click, keyboard entry, spoken input, and the like). The shopper thus uses browser 34 to engage in a dialogue with the product finder server 10. The shopper supplies basic information to the product finder server and responds to questions posed by expert system 12. In response, the product finder server 10 and expert system 12 make recommendations to the shopper on an appropriate product or products meeting the shopper's specifications.

If desired, the product finder system can be integrated with a retail server 36. The typical retail server may have an associated retail database 38 containing information about products available from that retailer. Typically the product information includes pricing information and shipping information, as illustrated diagrammatically at 40. The retail server 36 may implement an electronic shopping cart 42 into which the shopper can place selected items for purchase.

The shopping cart module normally includes e-commerce mechanisms to allow the shopper to provide his or her identification and shipping information as well as credit card or other payment information. While the retail server 36 and the product finder server 10 have been illustrated as separate entities in FIG. 1, it will be understood that both retail services and product finder services could be implemented on the same server, if desired.

There are some manufacturer-retailer relationships that prohibit or discourage the manufacturer to directly sell its products to shoppers. In some instances, the manufacturer may provide a manufacturer's suggested retail price; but the retailer is free to charge a price that is different from the suggested retail price. In any case, the business relationship between a manufacturer and its retailer often dictates that the manufacturer not compete for sales with the retailer. Thus, in a preferred embodiment, the present invention provides a finder that helps a shopper in choosing a particular product and then sends the shopper to another site where the purchase can be made online through a retailer. Alternatively, the finder of the invention can direct the shopper to a list of retail locations conveniently close to the shopper where the shopper can make the purchase.

The product finder system of the invention can be configured to use either the manufacturer's suggested retail price, or the actual offered retail price in assisting shoppers with product selection. The manufacturer's suggested retail pricing information may be stored in master database 30 and periodically uploaded to local database 22, as discussed above. The offered retail pricing information can be stored in retail database 38 and periodically uploaded to local database 22 using push or pull technology as discussed above. Alternatively, the product finder server 10 can query the retail server 36 on an as needed basis to determine pricing information needed to assist the shopper with product selection.

Figure 2:
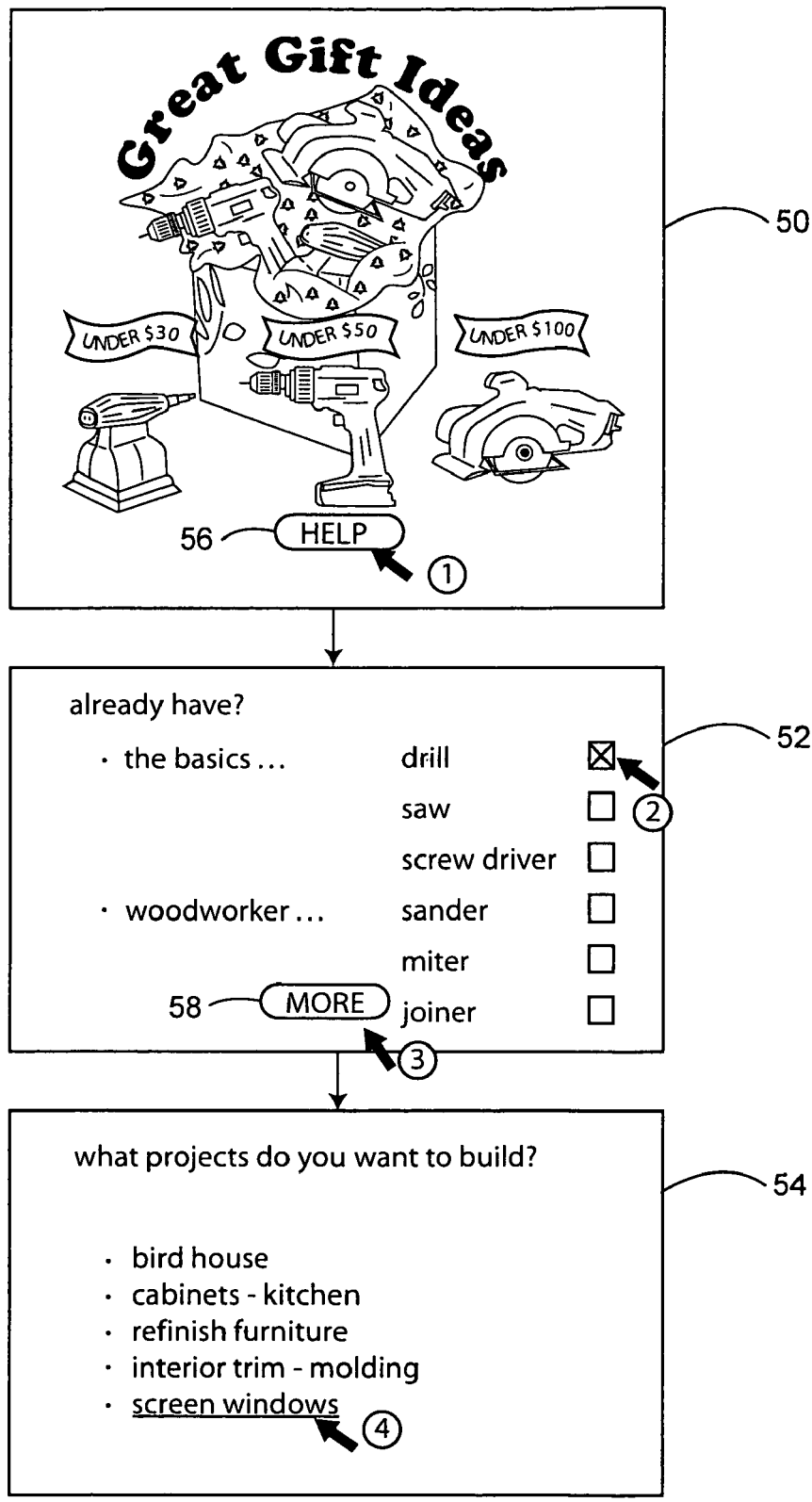
FIG. 2 is a flowchart diagram illustrating one embodiment of the expert system user interface in accordance with the invention.

FIG. 2 shows one example of the interactive dialogue between the shopper and the product finder server. Specifically, FIG. 2 shows a series of three screens 50, 52, and 54, illustrating one possible way of interacting with the product finder server. The illustration of FIG. 2 is geared towards assisting a shopper with making a gift selection. Thus, the dialogue with the product finder server is purposefully unsophisticated. The illustrated embodiment assumes that the shopper is not technically sophisticated and may not know how to specify his or her shopping requirements in technical terms.

Screen 50 asks a fundamental question: "how much do you want to spend?" If the user selects a price range, by clicking on one of the icons associated with different price ranges, that information will be transmitted to the product finder server and also stored in a temporary storage location for the duration of the product selection interaction. Temporary storage of the user's selection can be handled in a variety of ways. It can be stored on the server 10 or it can be stored in the memory of the user's equipment running browser 34. In an Internet implementation, cookie technology may be used for temporary information storage. Thus, the user's responses to interaction with the product finder server are stored in cookies on the user's machine, so that they can be sent to the product finder server as needed.

Whether the user has selected a price range or not, the user can click on the help button 56, which causes the server 10 to display another interactive screen, in this case, screen 52. Screen 52 is designed to identify what products the gift recipient already has. Thus, the shopper can click on one or more of the check boxes, to indicate which products can be excluded from the expert systems recommendations. In FIG. 2, at screen 52, the user has indicated that the gift recipient already owns a drill.

Clicking on the more help button 58 takes the shopper to screen 54 which asks the shopper to identify one or more projects that the intended gift recipient is interested in building. In this case, the shopper has selected "screen windows." The expert system 12 (FIG. 1) uses the information provided by the shopper through the series of on-screen interactions to make product selections. It does so by associating product class, product attribute and project information with the shopper's input selections. Based on these associations, the expert system is able to select products from the local database 22 that meet the shopper's criteria.

Figure 3:
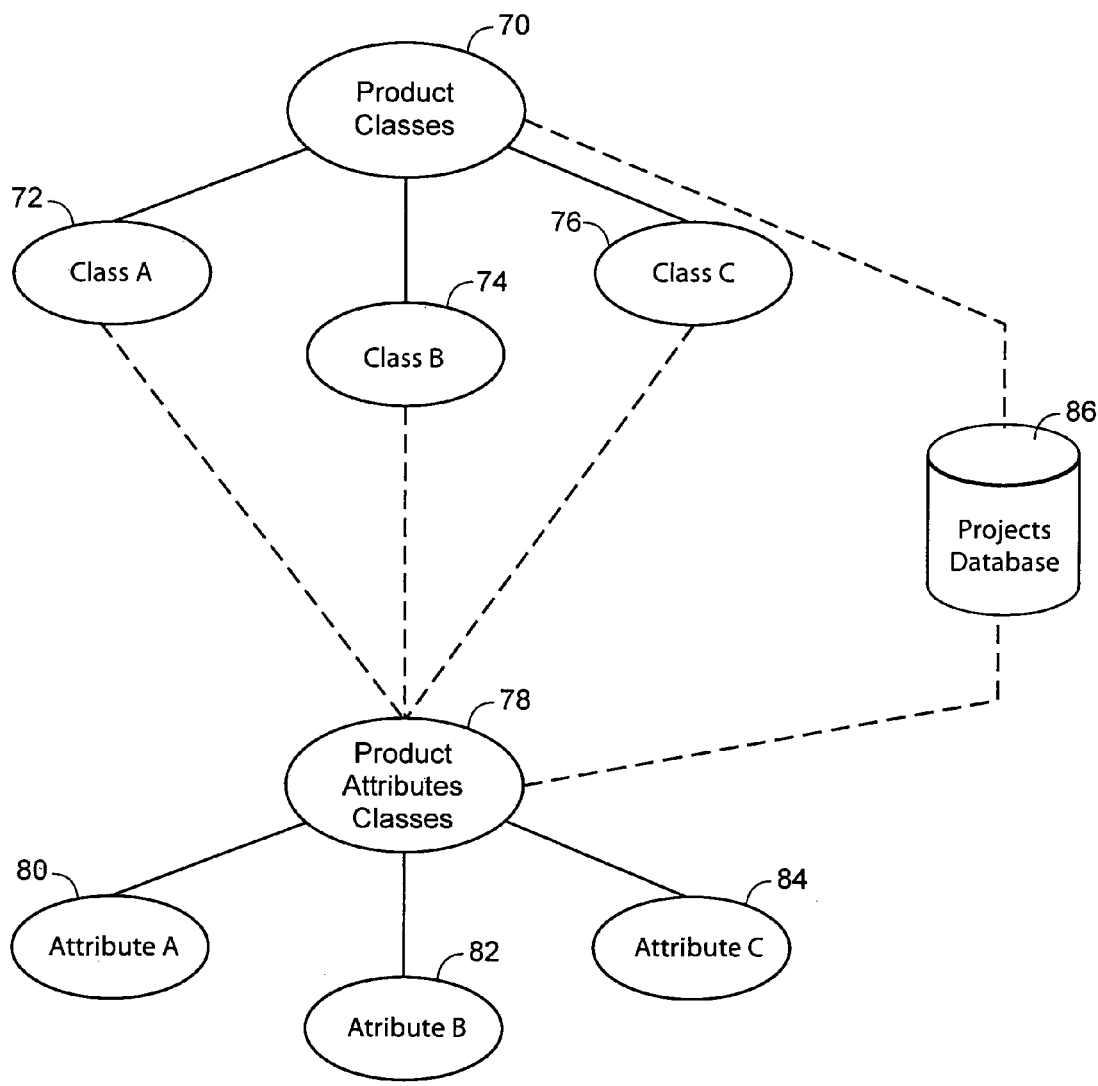
FIG. 3 is a data structure diagram illustrating one possible implementation of the expert system.

While there are a variety of different ways to configure a data structure to implement such product selection, FIG. 3 shows a presently preferred implementation. Specifically, FIG. 3 illustrates a data structure for defining the relevant relationships among different products, their attributes and capabilities. An object-oriented approach has been illustrated. Of course, other data structures are also possible. All products offered by the product finder system are grouped into product classes 70, such as class A 72, Class B 74 and Class C 76. Each of these classes can, in turn, be subdivided into further subsets. Each of the individual products in the respective product classes may have one or more distinguishing attributes. For example, a power drill may be distinguished on whether it is cord or cordless. Because some of these distinguishing attributes may be shared across different product class lines (power saws and power screwdrivers may also come in cord and cordless varieties) the data structure defines produce attributes classes 78, which may include a variety of individual attributes such as attributes 80, 82, and 84. By way of illustrating, attribute 80 might be the cord/cordless attribute; attribute 82 might be a manufacturer's suggested retail price range attribute, and so forth.

The data structure defines relationships among the product classes and the product attributes, as illustrated by the dashed lines connecting the product attributes classes 78 with the individual product classes 72, 74, and 76. The relationships are used in defining the structure and organization of information in local database 22 (FIG. 2). Local database 22 can be implemented as a relational database having suitable fields and records to store all of the available products according to their respective product classes, and including information regarding the relevant attributes associated with those products.

The relevant attributes associated with the products can be classified as quantitative attributes or as qualitative attributes. Quantitative attributes are those which refer to actual properties of the products. For example, a quantitative attributes of a drill would be, without limitation, whether the drill is cordless or corded, how much amperage is required to drive the drill, what kind of batteries if any, are required, the physical size of the tool, and so on. Quantitative attributes are assigned to a product and stored in a database as discussed, above.

Qualitative attributes, on the other hand, do not reflect actual properties of the product, but rather give information on the kind of product it is, the type of person who might be interested in it, the occasion for which the product is being bought, the skill level of the person using the product, and other such information not directly tied to the actual form the product is provided in. Whereas the quantitative attributes once assigned cannot be changed unless the actual product itself changes, the qualitative attributes are subject to amendment and elaboration by the manufacturer.

An example of a qualitative attribute is the skill level of the intended user of the product. As a nonlimiting example, the skill level can take on four different values as shown in the Table.

Skill Level of the User

Non Do-It Yourselfer
Light Do-It Yourselfer
Medium Do-It Yourselfer
Serious Do-It Yourselfer One or more of the attributes may be assigned to each product offered in the finder. It can be appreciated that the qualitative attributes in the Table do not refer to an inherent property of the product itself, but rather are related to a characteristic of the person using the product.

As another non-limiting example, a gift type attribute may be assigned to each product such as is indicated in the Table:

Gift Type Attribute

Hot Products
Gadget Guru
Multi-Purpose
Household Basics
Combo Kits
Nothing in Particular These attributes reflect both the characteristics of the recipient or user of the product and a characteristic of the product itself, however, the product characteristic is not inherent to the product, but rather reflects the subjective characterization of the manufacturer. Thus, for example, the "Gadget Guru" attribute may be assigned by the manufacturer to a product if it feels that the product would appeal to one who is interested in the latest gadgets. Likewise, the "Hot Products" may be assigned to a product that the manufacturer feels would appeal to those who like to keep up with the latest trends.

As a further non-limiting example, a qualitative attribute may consist of the interest of the intended user of the product shown in the Table:

Interest Attribute

Quick Repair
Easy Cleaning Ideas
Car Buff
Do Not Know
Refinishing/Woodworking
Renovation
Crafts
Any Power Tools
Landscaping
Lawn Maintenance Again, it can be appreciated that the interest attributes do not refer to a particular characteristic of the product, but rather reflect the characteristics of the recipient or user of the product.

In the gift finder embodiment of the invention, each product in the database is tagged with attributes such as skill level, interest, and gift type as shown above. In a preferred embodiment, the shopper is presented with a series of questions where the shopper will indicate which attributes he is most interested in. For example, the shopper may be instructed to pick a skill level and interest and a gift type from a list including possible values such as given above in the tables. It can be appreciated that the choice of attribute in any of those categories may, but need not depend on the choice of attribute in another category. Once all the attributes have been specified by the shopper, the database system and expert system create a screen through which all of the products flow during the search process. Only the products that meet the criteria selected by the shopper will flow through the screen. The result of the expert system search, that is, a list of products recommended to the shopper by the expert system, may consist of more than one product or of only one product. It is also possible that no single product will meet all the criteria selected by the shopper.

If no product meets all the criteria selected by the shopper, the shopper may be simply told of that result, and requested to try again. In a preferred embodiment, the invention provides for providing the shopper with the option of scrolling through popular items in the chosen price range if no single product meets all the criteria the shopper selected. Also in a preferred embodiment, and regardless of the results of the search, it is preferred to provide the option to the shopper to scroll up and down by price. This allows the shopper to consider purchases of products that otherwise meet the attributes such as skill level and interest of the recipient, but which are either more expensive or less expensive than the price range choice first entered by the shopper.

The product finder embodiment of the invention works differently from the gift finder. Here the shopper navigates through a series of questions. The series of questions posed by the expert system is based on a hierarchy. The question posed by the expert system will often, but need not depend on the answer to the previous question posed by the expert system. At the end of the navigation through the hierarchy, a product recommendation or recommendations is presented to the shopper. The product finder works in part by querying the quantitative attributes of the products in the database. The products are arranged in a hierarchy through which the shopper drills down by answering a series of questions. As noted above, the question posed by the expert system may depend on the answer to the previous question. The process ends when there is a recommendation of a product to be made by the expert system based on the characteristics of the product.

In an example, a shopper is looking for a drill. The first question posed by the expert system will ask the shopper to indicate that he is looking for a drill among all of the other product categories. Every drill in the product database has assigned to it quantitative attributes reflecting the actual properties of the drill such as "is it corded or cordless, what are the power requirements, and how large is the tool". One way of presenting the questions would be ask the shopper in a series of questions to choose the product quantitative attributes that he needs. For example, the database may inquire "do you want a corded drill, or do you want a non-corded drill". This would be a satisfactory procedure for a sophisticated shopper who knows exactly the difference between a corded drill and a non-corded drill and would be able to choose for himself which one he needs. However, an unsophisticated buyer would not be able to select a product based on such a question. The invention provides in a preferred embodiment that the questions rather be framed in terms of the benefits that the shopper is looking for. In the above example, the question might rather be posed as "which is more important to you, the unlimited run-time of a corded tool or the portability and convenience of a cordless tool". This question would signal to the shopper that he should choose a corded tool if he is more interested in unlimited run time and should use a cordless tool is portability and convenience are more important to him.

In another embodiment, the finder of the invention can operate as an online catalog. An online catalog is characterized by being searchable in a database having a limited number of quantitative attributes assigned to the products. This implementation is suitable for a shopper who has a good idea of what he wants to purchase and wants to go directly to a list of products he is interested in. For example, such a catalog embodiment may contain lists of replacement parts or accessories for other products. In such a case, the shopper would be interested in locating a list of accessories associated by a product by for example, putting in a product number.

Other preferred embodiments of the invention combine parts of the three embodiments discussed above. For example, in a gift finder implementation, it may be desirable to offer the shopper the option of putting in directly, a product name or a product number to accommodate the situation where he already knows exactly what he wants to purchase. Likewise, it may be desirable to offer the hierarchical drill down properties of a product finder implementation to one who is unsuccessful at finding what he is looking for using the non-hierarchical based on qualitative attributes. In a preferred embodiment of the invention, all three finders are offered as options. In such a preferred embodiment, the shopper can choose ahead of time the mode he wishes to try the database in.

Using product class and product attribute information, the expert system can select products that match some of the criteria supplied by the shopper during the interactive dialogue. For example, (referring to FIG. 2) if the user has indicated that the gift recipient already owns a drill, then the expert system would exclude the drill class of products from further consideration. Another similar screen or interactive dialogue might also have elicited that the shopper is looking for a cordless product. The expert system would thus exclude all corded products from further consideration.

While part of the product selection process can proceed based on only product class and product attribute information (exclude drills, exclude corded) a preferred embodiment goes a step further. A preferred embodiment also uses information about what projects the products are suitable for. For example, in screen 54 of FIG. 2, the shopper was able to indicate that the intended gift recipient wanted to build screen windows. To accommodate this kind of input, a presently preferred data structure includes a projects database 86. This database contains a list of projects with recommended products and/or recommended product classes and attribute combinations. The projects database can be supplemented from time to time, to add new projects or to identify different products that may be suitable for a given project. The projects database can be updated, for example, based on user interaction. A suitable web site could be provided to harvest information about projects that users are working on together with a list of the products those users found helpful. In this way, the projects database can be dynamically updated as new projects are discovered or as new uses for existing products are discovered by users.

Figure 4:
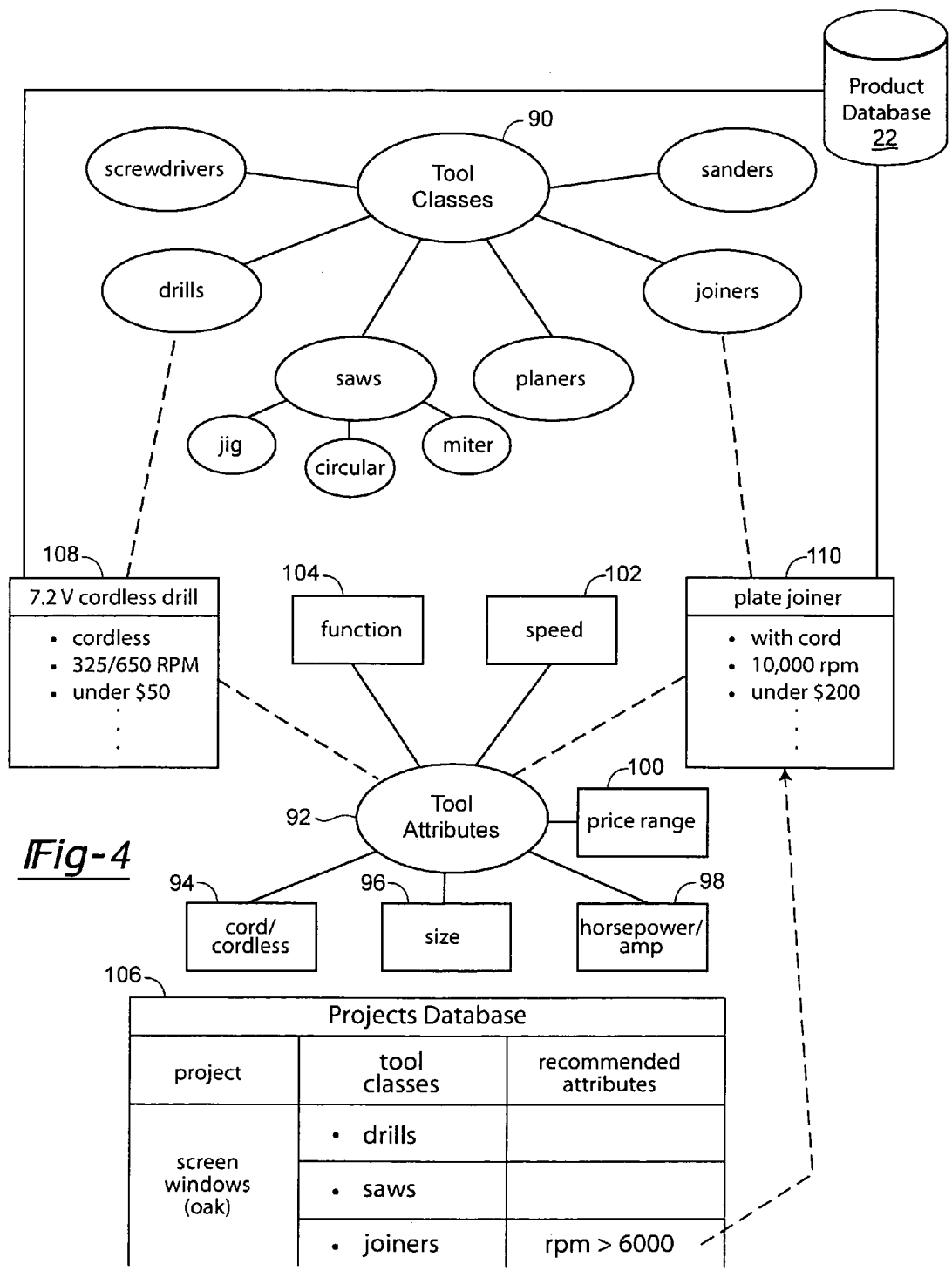
FIG. 4 is a detailed data structure diagram illustrating principles of the invention as applied to a power tool product line.

By way of further illustration, FIG. 4 shows how the product finder expert system and its associated data structures might be configured to implement a tool finder. In FIG. 4, the product classes have been identified specifically as "tool classes" 90. While the list is by no means exhaustive, the tool classes include screwdrivers, drills, saws, planers, joiners and sanders. Note that any individual tool class (such as saws) can be subdivided into subclasses, such as jig saws, circular saws, miter saws, and so forth.

With continued reference to FIG. 4, the product attributes associated with the tool classes 90 have been specifically designated as "tool attributes 92" Non-limiting examples of such attributes include cords/cordless, size, horsepower/amperage, price range, speed and function. The cord/cordless attribute 94 has already been discussed. The size attribute 96 might be used to designate physical package size (a factor when working in tight spaces). The horsepower/amperage attribute 98 would be generally indicative of the available power developed by the tool (certain materials may require more power to work than others). The price range attribute 100 might be used to designate manufacturer's suggested retail price ranges. Alternatively, actual offered retail prices may be used, as discussed above. The speed attribute 102 might be used to designate the rpm range over which the tool is capable of operating. For example, certain materials are best worked with at certain operating speeds (metal is drilled at low speed, wood at high speed). The function attribute 104 may be used to identify the basic functionality of the tool. Drills are for making holes, saws are for cutting material into smaller pieces, sanders are for removing material by abrading, and so forth.

An exemplary portion of a projects database is illustrated at 106. The projects database includes fields to identify the project, tool classes and recommended attributes needed for that project. In the specific illustration, the project is making screen windows from oak. The recommended tool classes include drills, saws and joiners. Although there are no recommended attributes for the drills and saws classes, the database contains a recommendation that the joiner should have a speed attribute or rpm greater than 6,000. Thus, if the shopper were looking to purchase a gift for a spouse who was interested in making screen windows from oak, the expert system would propose drills, saws and joiners to the shopper, with the restriction that only joiners having an rpm rating above 6,000 would be recommended. The expert system would thus select products from the local database 22 that meet the user-defined criteria. The expert system might therefore recommend a 7.2 volt cordless drill, shown as product 108 in FIG. 4. The plate joiner, product 110 in FIG. 4 might also be proposed, unless the user had restricted the range of interest to only cordless tools. Note that the plate joiner 110 is identified as being "with cord". Similarly, if the user had (in FIG. 2) indicated a desired price of under $50.00, then the plate joiner 110 (FIG. 4) would likewise be excluded from the recommendations.

A web page implementation of a gift finder according to the invention is illustrated in FIG. 5. The gift finder shown in FIG. 5 provides questions to the shopper via either a series of pull down menus 120 or a series of radio buttons 130. The questions provided include a gift type query 122, an interest query 124, a skill level query 126, and a preferred price query 128. After the shopper has indicated her choices and responses to all of the queries, the shopper is directed to click a button 140 to indicate to the system that she has made her choices and is ready for a recommendation.

As described above, all of the queries are presented to the shopper on the same web page. In an embodiment not shown in FIG. 5, each query can be presented to the shopper on a different page. At the end of the last query, the shopper may be given a button to indicate that she is finished with her answers.

From the foregoing, it will be appreciated that the product finder can be adapted to a wide range of uses, with tool selection being only one of such uses. Moreover, while the system has been illustrated in a context of a "gift finder", the system architecture will readily adapt to other applications as well. For example, instead of employing unsophisticated, gift-finding interactive dialogue of FIG. 2, the system may be instead configured to ask a series of sophisticated questions, suitable for assisting professionals in product selection. To adapt the system to a desired use, the system designer populates the expert system with questions and selection options directed to the sophistication level of the anticipated user. These questions and options are then tied to the product classes and attribute classes that are applicable.

EXAMPLES

Example 1

An accessory selector is provided to help consumers find the right accessory for their application or job. It is implemented over the internet, and shoppers access the selector over a local access terminal running a web browser such as Internet Explorer or Netscape. The selector asks a series of set questions that returns accessory solutions dependent on the answers chosen. The categories covered in the accessory selector are organized in three main areas as follows:

Around the House:
Batteries & chargers
Chucks & chuck keys
Drilling/making a hole
Lighting
The many uses of a rotary tool
Planing
Polishing/buffing
2 in 1 making a hole/screwdriving system Removing paint or rust
Sanding
Sawing/making a cut
Screwdriving
Using a router
Easy Clean-Up:
Scrubbing—scrub pads, brushes, et.
Vacuuming—vacuum filters
In the Lawn:
Cutting the lawn—mower blades and attachments
Manicuring/trimming the lawn—string trimmer spools and shrubber blades and edger blades
Trimming the hedges—hedge trimmer blades
Vacuuming/mulching/blowing the leaves These categories revolve around common applications. The logic of the selector is meant to reflect that of the consumer. The selector first asks the consumer to select what application best reflects the task at hand. The questions that then follow further probe into what intended tool will be used. Accessories and attachments are returned as solutions depending on what answers were selected.

Example 2

A gift finder assists customers to find a particular product of interest or offer gift suggestions based on information about the recipient of the gift. Qualitative attributes are assigned to all of the products in a product database. The qualitative attributes deal with the skill level of the intended user, a manufacturer suggested retail price, the interest of the recipient, and the type of gift the shopper wishes to give.

The shopper interacts with the system over a standard web browser, as in Example 1. The questions to be answered by the shopper are presented on the web page by means of question lists, radio buttons, dialogue boxes, and pull down menus. As an initial step, the shopper is asked whether she has a specific product in mind. If she answers that she has a specific product in mind, the system presents her with Question Set No. 1.

The first question of Set No. 1 asks the shopper to select a catalog from among the choices: power tools, outdoor power equipment, and cleaning products. Next, the shopper is presented a question to select a category of products in the catalog just selected. If the catalog selected was outdoor power equipment, the choice of categories includes:

Blower vacs
Edgers
Grass shears
Detail shrubbers
Hedge trimmers—electric
Hedge trimmers—cordless
Mowers—electric
Mowers—cordless
String trimmers—electric
String trimmers—cordless
Sprayer Next the shopper may be prompted to select a skill level from among the choices:

Non do-it yourselfer
Light do-it yourselfer
Medium do-it yourselfer
Serious do-it yourselfer At the same time, the shopper may be prompted to select a preferred price range.

On the other hand, if the shopper indicates in the initial step that she has no specific product in mind, the system presents her with Question Set No. 2. In Set No. 2, the system first prompts her to select the type of gift she wishes to give. The choices under this selection include:

Hot products
Gadget gurus
Multi-purpose
Household basics
Combo kits
Nothing in particular Thereafter, the shopper is prompted to choose an interest of the recipient. The choices of interest include:

Quick repair/fix-up
Refinishing/woodworking
Renovation
Crafts
Any power tools
Landscaping
Lawn maintenance
Yard clean-up
Any outdoor power equipment
Easy cleaning ideas After the shopper has responded to questions about the gift type and the interest of the recipient, the shopper is given the chance to indicate the approximate skill level of the recipient, and an amount she would like to spend, as described above. Thereafter, the finder returns an answer with products matching the answer choices the shopper has given.

In either case, that is, whether the shopper has a specific product in mind, or has no specific product in mind, if no product having all the attributes specified by the shopper are found by the search, the shopper is given the option of viewing the most popular products in the category or price range she selected.

While the invention has been described in its presently preferred embodiments, it will be understood that the principles of the invention can be extended to other embodiments and implementation without departing of the invention as set forth in the appended claims.

We claim:

1. A networked system to assist a shopper in selecting a product intended for a user, the system comprising:
    a) a master database of products which contains information about the products, their specifications, and detailed engineering data, wherein the products have qualitative attributes subjectively assigned to the products that reflect information about potential users of the products;
    b) a products database server serving contents of the master database over a network;
    c) a user interface;
    d) an expert system posing questions over the user interface to the shopper and querying the database in response to answers to the questions;
    e) a projects database containing a data structure of projects for which products are suitable with at least one of recommended product classes or attribute combinations; and
    f) a product finder server connected to said expert system and said projects database, said product finder server receiving at least part of the information about products and relevant specifications from said product database server;
    wherein the questions posed comprise questions about the user and questions about the product, including at least one product for which the product should be suitable, and the selections made by the system are dependent upon the qualitative attributes assigned to the products, and projects for which the products are suitable.

2. A system according to claim 1, wherein said projects database is a local database directly connected to said product finder server.

3. A system according to claim 1, wherein said projects database is connected to said product finder server over the network.

4. A system according to claim 3, wherein the network is the Internet.

5. A system according to claim 1, wherein the information subset for said projects database is periodically pumped from said master database.

6. A system according to claim 1, wherein said master database is a dynamically updated central database.

7. A system according to claim 1, further comprising a retail database containing price information and shipping information.

8. A system according to claim 7, further comprising a retail server serving the retail database over the network, wherein the price information is periodically uploaded to said products database.

9. A system according to claim 1, wherein the user interface further comprises point and click ordering means.

10. A system according to claim 1, wherein the products are tools.

11. A system according to claim 8, wherein the products are tools.

12. A system according to claim 1, wherein the questions about the users comprise questions about the skill level of the user.

13. A system according to claim 12, wherein the questions further comprise questions about the interests of the user.

14. A networked system to assist a shopper in selecting a product, intended for a user, the system comprising:
    a) a master database of products which contains information about the products, their specifications, and detailed engineering data, wherein the products having qualitative attributes subjectively assigned to the products that reflect information about intended uses of the products;
    b) a product database server serving contents of the master database over a network;
    c) a user interface;
    d) an expert system posing questions over the user interface to the shopper and querying the database in response to answers to the questions;
    e) a projects database containing a data structure of projects for which products are suitable with at least one of recommended product classes or attribute combinations; and
    f) a product finder server connected to said expert system and said projects database, said product finder server receiving at least part of the information about products and relevant specifications from said product database server;
    wherein the questions posed comprise questions about the user and questions about the product, including at least one product for which the product should be suitable, and the selections made by the system are dependent upon the qualitative attributes assigned to the products, and projects for which the products are suitable.

15. A system according to claim 14, wherein the products are tools, and the questions comprise questions about the projects to be built with the tools.

16. A system according to claim 14, wherein the network is the Internet.

17. The system of claim 12, wherein the questions about the skill level of the user relate to questions about user skill levels respective of tool products.

18. The system of claim 17, wherein the tool products have assigned user skill levels selected from non do-it yourselfer, light do-it yourselfer, medium do-it yourselfer, and serious do-it yourselfer.

19. The system of claim 13, wherein the questions about the interests of the user relate to questions about user interests respective of tool products.

20. The system of claim 19, wherein the tool products have assigned user interests selected from quick repair, easy cleaning ideas, car buff, do not know, refinishing/woodworking, renovation, crafts, any power tools, landscaping and lawn maintenance.

21. A system according to claim 12, wherein the questions further comprise questions about an occasion for which the product is being purchased.

22. The system of claim 21, wherein the questions about an occasion for which the product is being purchased relate to questions about purchase occasions respective of tool products.

23. The system of claim 22, wherein the tool products have assigned purchase occasions selected from hot products, gadget guru, multi-purpose, household basics, combo kits, and nothing in particular.

24. The system of claim 1, wherein said product finder server receives an information subset that excludes the detailed engineering data, and said product database server supplies contents of said master database to multiple other servers providing different kinds of services, and filters the contents provided to the multiple other servers according to requirements for providing the different kinds of services.

25. The system of claim 24, wherein said products database server provides contents of said master database including at least the detailed engineering data to engineering teams who are working on developing new products.

26. The system of claim 24, wherein said product database server serves information to a business-to-business server designed to facilitate ordering of products to restock retail shelves and warehouses.

* * * * *